Oct. 22, 1946.  P. KAY  2,409,940
ROD TO REEL CONNECTION
Filed March 28, 1945
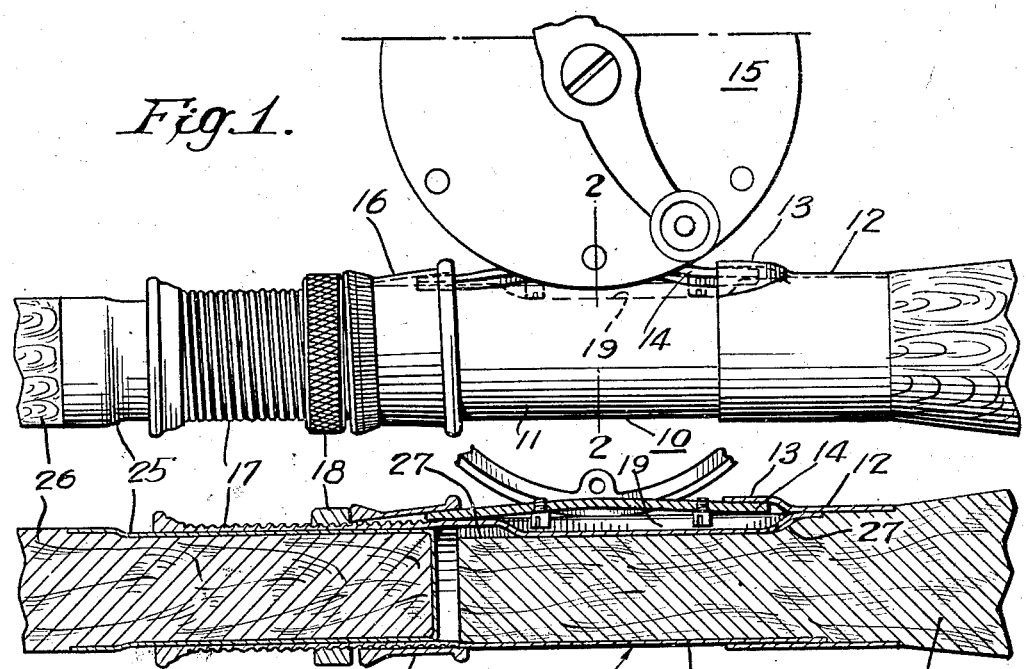
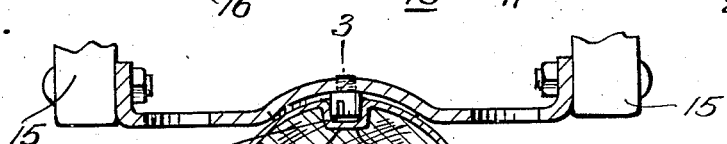
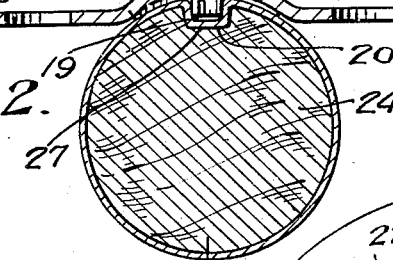
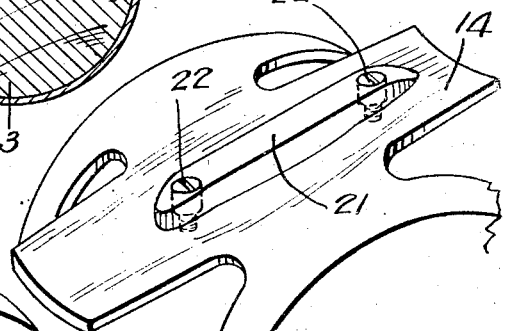
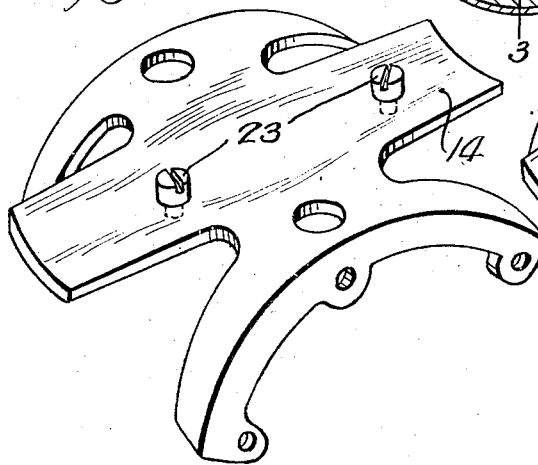
Inventor:
Paul Kay
by his Attorneys
Howson & Howson Patented Oct. 22, 1946

2,409,940

UNITED STATES PATENT OFFICE 2,409,940

ROD TO REEL CONNECTION

Paul Kay, Philadelphia, Pa., assignor to Ocean City Manufacturing Company, Philadelphia, Pa., a corporation of Pennsylvania Application March 28, 1945, Serial No. 585,235

12 Claims. (Cl. 43—22)

This invention relates to a rod to reel connection for fishing rods and more particularly to a mounting for relatively large fishing reels of the type ordinarily used in salt water fishing.

In such reel mountings, the rod is usually provided with a metallic sleeve at one end of which is a fixed socket receiving one end of the reel tang and in the other end of which there is an adjustable socket often in the form of a canting ring which receives the opposite end of the tang. This adjustable socket is locked in position in a variety of manners including, in the better class of rods, a threaded ring which abuts the socket ring to lock it in position. The loads imposed on such reels are often relatively heavy and since the reel itself is of a relatively large size and accordingly the center of load application is well spaced from the reel tang, there is a tendency of the reel to wobble, loosening its engagement with the sockets and in many cases causing its highly inconvenient disengagement from the rod. For this reason, experienced fishermen jam the securing means of the movable socket as firmly into position as is possible, often scarring the securing means in the process by the use of tools. The slippage of the reel upon the rod is due to a large extent to the fact that the sleeve forming the reel seat has a smooth surface between the sockets and the reel tang itself has a relatively smooth surface.

An important object of the present invention is the provision of a rod to reel connection which will eliminate this wobbling and will accordingly eliminate the necessity for so tightly clamping the movable socket into position.

Another object of the invention is the provision of a connection of this type which will enable the use of reels of varying sizes upon the rod.

A still further object of the invention is the provision of such a connection which may be incorporated in the rod and reel with a minimum change therein and which will not render the rod or reel unusable in event either thereof is not equipped to enter into the combination.

A still further object is the provision of a connection of this character which will increase the efficiency of the connection between the reel seat sleeve and the butt of the rod.

These and other objects I attain by the construction shown in the accompanying drawing wherein for the purpose of illustration I have shown a preferred embodiment of my invention and wherein:

Fig. 1 is a fragmentary side elevation illustrating a rod to reel connection constructed in accordance with my invention;

Fig. 2 is a section on line 2—2 of Fig. 1;

Fig. 3 is a section on line 3—3 of Fig. 2; and

Figs. 4 and 5 are perspective views illustrating alternative forms of reel tang for use in the combination, Fig. 4 illustrating the tang of Figs. 1 to 3.

Referring now more particularly to the drawing, the numeral 10 generally designates a reel seat consisting of a sleeve 11 having at one end a fixed ferrule 12 embossed to form a stationary socket 13 receiving one end of the tang 14 of the fishing reel 15. Loosely fitting upon and slidable longitudinally of the sleeve 11 is a collar 16 forming a socket receiving the opposite end of the tang, this collar being provided with suitable locking means for holding it against longitudinal displacement on the sleeve after its engagement with the tang. As at present shown, the sleeve is externally threaded at 17 and has mounted thereon a ring nut 18 for this purpose. It will be understood, however, that the type of movable socket and locking means therefor employed are optional and may be any of the types now in common use.

In accordance with my invention, I emboss the sleeve inwardly to form a fairly deep longitudinal groove 19, the embossing providing at the interior of the sleeve a longitudinal rib 20, the purpose of which will hereinafter appear. This groove is made of less width than the reel tang 14 of reels of the type to be accommodated and extends from the fixed socket toward the movable socket for a distance slightly less than the length of the shortest tang of reels of the class to be accommodated. The reel tang 14 is, as is well known, an elongated strip of metal attached to or forming a part of the reel frame, the latter construction being illustrated in the present instance, this strip having its under or seat confronting surface concaved so that it may nearly conform to the diameter of the sleeve of the reel seat 10. This under surface is provided with a medial longitudinal key 21 to fit between the side walls of the groove 19 and of a length to extend over a substantial portion of this groove. This key will serve to prevent displacement of the reel upon the rod by reason of the side strains placed thereon and accordingly enable the reel to be held in position upon the rod simply by applying enough locking pressure through the locking means 18 to prevent collar 16 from being displaced by ordinary jolts or jars. The key is preferably of a depth such that it projects slightly below a plane including the side edges of the concave face of the tang, thereby insuring its proper engagement in the groove.

Since it may often be desirable to employ a reel constructed for use with a reel seat of this character with a reel seat of the ordinary character, the key should be made detachable, as for example, the employing spaced removable screws 22. Furthermore, since side strains of the character which are being opposed by the key will be imposed upon the key adjacent the ends thereof, the key may be made discontinuous and may, as shown in Fig. 4, consist simply of a pair of headed screws 23 of the proper diameter mounted in the tang at spaced points.

The embossing of sleeve 11 to provide the groove 19 and the consequent formation of the internal rib 20 assists materially in insuring the proper connection of the sleeve to the rod. In the usual construction the sleeve 11 receives in one end the rod butt 24 and in its opposite end the ferrule 25 attached to the rod tip 26. The ferrule 25 often becomes corroded and is extremely difficult to remove necessitating the use of tools. Obviously this places a very heavy strain upon the sleeve connection to the rod butt. In my invention, the rod butt 24 is longitudinally grooved as at 27 with a groove fitting rib 20. Obviously any strains tending to rotate sleeve 11 upon the butt are solidly met.

Since the construction illustrated is obviously capable of considerable modification without departing from the spirit of my invention, I do not wish to be understood as limiting myself thereto except as hereinafter claimed.

I claim:

1. A reel seat for fishing rods comprising a sleeve to fit the rod butt having a fixed socket adjacent one end thereof adapted to receive one end of the tang of a fishing reel and adjacent its other end an adjustable ring having a socket to receive the other end of the tang, said sleeve between said sockets having a smooth surface interrupted by a single longitudinal groove of considerable depth, disposed medially of the fixed socket and extending from a point adjacent the mouth of the fixed socket for a substantial distance toward the last named end of the sleeve, said groove being of a width less than the width of the tang to be seated on said surface, and a medial key on the tang adapted to engage in said groove.

2. A reel seat for fishing rods comprising a sleeve to fit the rod butt having a fixed socket adjacent one end thereof adapted to receive one end of the tang of a fishing reel and adjacent its other end an adjustable ring having a socket to receive the other end of the tang, said sleeve between said sockets having a smooth surface interrupted by a single embossed longitudinal groove of considerable depth, disposed medially of the fixed socket and extending from a point adjacent the mouth of the fixed socket for a substantial distance toward the last named end of the sleeve, said groove being of a width less than the width of the tang to be seated on said surface and a medial key on the tang to engage in said groove, the embossing of the sleeve providing an internal longitudinal rib on the sleeve, and a rod butt fitted in the sleeve and having a groove receiving said rib.

3. A reel seat engaging tang for fishing reels comprising an elongate strip having a longitudinal medial key on the rod engaging face thereof.

4. A reel seat engaging tang for fishing reels comprising an elongate strip having a longitudinal, sectional, medial key on the rod engaging face thereof.

5. A reel seat engaging tang for fishing reels comprising an elongate strip having a longitudinal, detachable, medial key on the rod engaging face thereof.

6. A reel seat engaging tang for fishing reels comprising an elongate strip having a longitudinal, sectional, detachable, medial key on the rod engaging face thereof.

7. A reel seat engaging tang for fishing reels comprising an elongate strip, one face of which is concave and has a longitudinal medial key thereon of a depth such that it projects below a plane including the edges of the concave surface of the strip.

8. A reel seat engaging tang for fishing reels comprising an elongate strip, one face of which is concave and has a longitudinal, sectional, medial key thereon of a depth such that it projects below a plane including the edges of the concave surface of the strip.

9. A reel seat engaging tang for fishing reels comprising an elongate strip, one face of which is concave and has a longitudinal, detachable, medial key thereon of a depth such that it projects below a plane including the edges of the concave surface of the strip.

10. A reel seat engaging tang for fishing reels comprising an elongate strip, one face of which is concave and has a longitudinal, sectional, detachable, medial key thereon of a depth such that it projects below a plane including the edges of the concave surface of the strip.

11. A reel seat to reel connection for fishing rods comprising a reel seat including a sleeve to fit the rod butt having a fixed socket adjacent one end thereof adapted to receive one end of the attaching tang of a fishing reel and adjacent its other end an adjustable ring forming a socket to receive the other end of said tang, said sleeve between said sockets having its smooth surface interrupted by a single longitudinal groove of considerable depth, said groove being disposed medially of the fixed socket and extending from a point adjacent the mouth of the fixed socket for a substantial distance toward the last named end of the sleeve, and a reel tang for engagement with said seat comprising an elongate strip of greater width than said groove adapted at its ends for engagement in said sockets and having a medial key to engage in said groove.

12. A reel seat to reel connection for fishing rods comprising a reel seat including a sleeve to fit the rod butt having a fixed socket adjacent one end thereof adapted to receive one end of the attaching tang of a fishing reel and adjacent its other end an adjustable ring forming a socket to receive the other end of said tang, said sleeve between said sockets having its smooth surface interrupted by a single longitudinal groove of considerable depth, said groove being disposed medially of the fixed socket and extending from a point adjacent the mouth of the fixed socket for a substantial distance toward the last named end of the sleeve, and a reel tang for engagement with said seat comprising an elongate strip of greater width than said groove adapted at its ends for engagement in said sockets and having a medial key to engage in said groove, the embossing of the sleeve providing an internal longitudinal rib on the sleeve, and a rod butt fitted in the sleeve and having a groove receiving said rib.

PAUL KAY.